(12) United States Patent
De Castelbajac et al.

(10) Patent No.: US 10,195,745 B2
(45) Date of Patent: Feb. 5, 2019

(54) ASSEMBLY DEVICE FOR REPLACING A GRIPPER TIP OF A GRIPPER FINGER FOR A ROBOTIC SYSTEM

(71) Applicant: F&P Robotics AG, Glattbrugg ZH (CH)

(72) Inventors: Charles De Castelbajac, Zürich (CH); Hansruedi Frueh, Aadorf (CH); Norman Wijeyratne, Kloten (CH)

(73) Assignee: F&P ROBOTICS AG, Glattbrugg (CH)

( * ) Notice: Subject to any disclaimer, the term of this patent is extended or adjusted under 35 U.S.C. 154(b) by 0 days.

(21) Appl. No.: 15/123,487

(22) PCT Filed: Mar. 17, 2014

(86) PCT No.: PCT/EP2014/055274
§ 371 (c)(1),
(2) Date: Sep. 2, 2016

(87) PCT Pub. No.: WO2015/139717
PCT Pub. Date: Sep. 24, 2015

(65) Prior Publication Data
US 2017/0072571 A1    Mar. 16, 2017

(51) Int. Cl.
*B25B 11/02* (2006.01)
*B23P 19/04* (2006.01)
*B25J 15/04* (2006.01)

(52) U.S. Cl.
CPC .......... *B25J 15/0475* (2013.01); *B23P 19/04* (2013.01); *B25B 11/02* (2013.01)

(58) Field of Classification Search
CPC .......... B23P 19/04; B23P 19/10; B25B 1/103; B25B 1/20; B25B 1/2405; B25B 1/2463;
(Continued)

(56) References Cited

U.S. PATENT DOCUMENTS 1,619,281 A * 3/1927 White ...................... B23Q 1/72
                                                                   82/117
4,252,358 A * 2/1981 Klebs ........................ B66C 1/62
                                                                   294/119.1
(Continued)

FOREIGN PATENT DOCUMENTS

CN        103358120 A    10/2013
DE       202011052430 U1    5/2013
(Continued)

OTHER PUBLICATIONS

International Search Report dated Nov. 17, 2014 in International Patent Application No. PCT/EP2014/055274, filed Mar. 17, 2014 (with English Translation).

*Primary Examiner* — Tyrone V Hall, Jr.
(74) *Attorney, Agent, or Firm* — Global IP Counselors, LLP

(57) ABSTRACT

A mounting device includes a mounting rail with a base carriage and a distance carriage for replacing a gripper tip of a gripper finger for a robot system. The base carriage includes a first fixing agent for fastening a gripper jaw of the gripper finger and the distance carriage includes a second fixing agent for fastening the gripper tip such that the gripper jaw can be fastened by the first fixing agent to the base carriage and the gripper tip can be fastened by the second fixing agent to the distance carriage. The base carriage and the distance carriage are arranged movably against each other between a locked position and an unlocked position along the longitudinal direction such that the gripper tip is locked at the gripper jaw in the locked position and unlocked from the gripper jaw in the unlocked position.

20 Claims, 3 Drawing Sheets

(58) Field of Classification Search
CPC ....... B25B 1/2478; B25B 11/02; B25B 27/00; B25B 27/02; B25B 27/04; B25B 27/10; B25B 27/16; B25B 5/102; B25J 15/04; B25J 15/0475
See application file for complete search history.

(56) References Cited

U.S. PATENT DOCUMENTS

| | | | | |
|---|---|---|---|---|
| 4,583,724 A | * | 4/1986 | Huang | B25B 1/20 269/182 |
| 4,613,277 A | | 9/1986 | Guay | |
| 4,691,905 A | * | 9/1987 | Tamura | B23K 37/047 269/266 |
| 4,699,414 A | | 10/1987 | Jones | |
| 5,139,246 A | * | 8/1992 | Yakou | B25B 1/18 269/242 |
| 5,206,980 A | * | 5/1993 | Chapman | B23P 19/10 254/29 R |
| 5,305,510 A | * | 4/1994 | Croft | B21D 39/04 29/237 |
| 6,367,788 B1 | * | 4/2002 | Babchuk | B23K 37/0443 269/45 |
| 6,502,809 B1 | * | 1/2003 | Gionta | B25B 1/2478 269/154 |
| 7,017,253 B1 | * | 3/2006 | Riggle | B25B 1/103 269/276 |
| 7,293,765 B2 | * | 11/2007 | Hooper | B25B 1/103 269/246 |
| 2002/0064362 A1 | | 5/2002 | Chou et al. | |
| 2010/0283193 A1 | * | 11/2010 | Huang | B60G 11/15 267/140.2 |
| 2014/0020231 A1 | * | 1/2014 | Raczuk | B25B 27/10 29/525.01 |

FOREIGN PATENT DOCUMENTS

| | | |
|---|---|---|
| JP | S56020135 A | 5/1981 |
| JP | H06262281 A | 9/1994 |
| JP | H07328869 A | 12/1995 |
| JP | 2013094930 A | 5/2013 |

* cited by examiner

ASSEMBLY DEVICE FOR REPLACING A GRIPPER TIP OF A GRIPPER FINGER FOR A ROBOTIC SYSTEM

CROSS-REFERENCE TO RELATED APPLICATIONS

This application is a U.S. National Stage application of International Application No. PCT/EP2014/055274, filed Mar. 17, 2014, the contents of which is hereby incorporated herein by reference.

BACKGROUND

Field of Invention

The invention relates to a mounting device for replacing a gripper tip of a gripper finger for a robot system.

Background Information

Gripper fingers for robot systems have long been known in the prior art in many different variants. The known gripper fingers usually comprise two gripper jaws, each with one gripper tip. The gripper jaws are, for example, fastened movably to linear guides and constructed movably towards and away from each other. As a result, also the two gripper tips attached thereto can be moved exactly towards and away from each other in such a manner that objects can specifically be grasped or put down again. Such gripper systems are known to the man skilled in the art under the term "parallel-grippers". Such systems for grasping workpieces are for example known from EP 0 2231 B1, EP 0 993 916 B1 or EP 2 548 706 A1.

There are robots, so called "buckling arm robots" described for example in WO 02/086637 A1" whose application is much more flexible and which are often used advantageously in particular for mobile robot systems.

Nowadays gripper fingers are not only mechanical gripping tools, but highly complex systems which can often contain sensors of different types, such as optical cameras, ultrasonic sensors or other acoustic sensors, such as microphones, or thermal sensors, force sensors etc. By such sensors a correspondent robot system can "feel" its environment with the gripper fingers and detect the properties of its environment which are essential for the function of the robot system.

Thus, such robot system can for example recognize independently whether an object to be grasped is rather a soft object, such as a plastic bottle, or rather a hard object, such as a glass bottle and it can then adjust independently and flexibly a force necessary for the gripper fingers to grasp the object to an optimum value.

SUMMARY

This is of particular importance if such a robot system is used for carrying out delicate assemblies with very different components or if, for example, a human being should be supported in various everyday activities. In particular, in the case when such a robot system interacts directly with a human being, a highly sensitive sensor technology is, of course, of the utmost importance.

Particular importance is attached to the gripper tip of a gripper finger because, on the one hand, when grasping an object to be moved, the gripper tip must be brought into touching contact with this object, and on the other hand the gripper tip often contains the sensors necessary for recognizing the environment and recognizing the properties of the objects to be grasped. For this reason in many applications the gripper tip must in each case be individually adjusted to the tasks to be performed specifically or the properties of the working environment, and thus finally to the particular properties of the objects to be grasped and to be moved. In order to use one and the same robot system for a plurality of different tasks, it is a known to design the gripper tips to be exchangeable. For example, a set of different gripper tips can be provided which can differ, for example, in their gripping geometry, material, surface finish, sensor technology and so on, each being optimally adapted to certain tasks to be performed. As a result, very different tasks can be carried out by one and the same robot system only by replacing the gripper tips of the gripper finger.

Especially in applications where the robot systems must perform highly complex or very different tasks and therefore the gripper tips must often be replaced, it is, of course, desirable that the replacement of the gripper tip can be done as simply as possible and preferably mechanically. This is one of the essential problems of known systems, since in complex procedures the gripper tips must often be removed, for example unscrewed, from the gripper jaw. When changing the gripper tip, it is complex to separate and to reinstall additional possibly existing electrical connecting lines for the sensor technology between the gripper jaw and the gripper tip or hydraulic or pneumatic connections for possibly existing driving units for driving movable parts of the gripper tip.

Therefore, the applicant has developed a gripper finger including a gripper jaw and a gripper tip as well as a corresponding robot system where the disadvantages known from the prior art are reliably remedied in such a manner that the gripper tip can be replaced in a particularly simple, efficient and notably mechanical way, possibly by the corresponding robot system itself.

Although the gripper finger mentioned above and newly developed by the applicant is, in principle, optimally suited for an automatic replacement of the gripper tip, it has become evident that there is, however, no sufficiently developed mounting device for replacing a gripper tip of a gripper finger for a robot system in a reliable, simple and thus efficient way.

It is therefore an object of the invention to provide a mounting device for replacing a gripper tip of a gripper finger of a robot system which allows to replace a gripper tip of a gripper finger for a robot system in a reliable, simple and efficient way. In particular it is, inter alia, an object of the invention to propose a mounting device which allows to replace in addition to a plurality of gripper tips especially a gripper tip of the type described in FIG. 1.

The subject matters of the invention which solve these problems are described herein.

Additional particularly advantageous embodiments of the invention are also further described.

Thus, the invention relates to a mounting device having a mounting rail comprising a base carriage and a distance carriage for replacing a gripper tip of a gripper finger for a robot system. In this respect the base carriage comprises a first fixing agent for fastening a gripper jaw of the gripper finger and the distance carriage comprises a second fixing agent for fastening the gripper tip in such a manner that the gripper jaw can be fastened by the first fixing agent to the base carriage in relation to a longitudinal direction and the gripper tip can be fastened by the second fixing agent to the distance carriage in relation to the longitudinal direction. According to the invention the base carriage and the distance carriage are arranged movably against each other between a locked position and an unlocked position along the longitudinal direction in such a manner that the gripper tip is locked at the gripper jaw in the locked position and the gripper tip is unlocked from the gripper jaw in the unlocked position.

Therefore it is an essential characteristic of the invention that first of all the mounting device comprises two receiving carriages movably against each other, namely the base carriage and the distance carriage in such a manner that both can be arranged movably towards or away from each other in the longitudinal direction on the mounting carriage during the replacement procedure, i.e. when the parts to be separated or to be assembled, namely the gripper jaw and the gripper tip of the gripper finger, are mounted or dismounted. And secondly, that the gripper tip and the gripper jaw can be fastened independently from each other to the distance carriage and the base carriage, respectively, in relation to the longitudinal direction in such a manner that during the replacement procedure of the gripper tip only the gripper tip or only the gripper jaw or both simultaneously can be fastened to the mounting device in relation to the longitudinal direction. This allows not only a reliable and efficient separation and assembly of the parts, but this provides also an enormous flexibility to the mounting device according to the invention with respect to the parts to be mounted or dismounted.

In a particularly important embodiment for the practice, the first fixing agent is a first fixing bolt and/or the second fixing agent is a second fixing bolt. It is not absolutely necessary, but especially advantageous that the first fixing bolt is arranged perpendicular in relation to the longitudinal direction at the base carriage in such a manner that the gripper jaw can be fastened by the first fixing bolt in a first fixing hole of the gripper jaw at the base carriage in relation to the longitudinal direction, and preferably also the second fixing bolt is arranged perpendicular in relation to the longitudinal direction at the distance carriage in such a manner that the gripper tip can be fastened by the second fixing bolt in a second fixing hole of the gripper tip at the distance carriage in relation to the longitudinal direction.

Depending on the special geometric construction, the gripper tip and the gripper jaw are often fastened by the first fixing agent and the second fixing agent only in relation to the longitudinal direction and more or less freely movable at least in relation to a direction perpendicular to the longitudinal direction. In order to replace the gripper tip reliably in practice, it is, however, very often advisable to ensure a defined guidance of gripper tip and/or gripper jaw along the longitudinal direction. Therefore, the first and/or the second fixing agent often comprise in practice several components for guiding or fastening the gripper tip and gripper jaw. For example, the first fixing agent can advantageously simultaneously be a first guiding element, in particular a U-shaped guiding element for receiving and guiding the gripper jaw in the longitudinal direction and comprise preferably simultaneously the first fixing bolt or as described below, alternatively or additionally also the blocking bolt. Correspondingly this may, of course, also apply to the second fixing agent which can advantageously simultaneously be a second guiding element, in particular a U-shaped guiding element for receiving and guiding the gripper tip in the longitudinal direction or, as described below, comprise alternatively or additionally the blocking bolt.

Thus, the first guiding element and/or the second guiding element can comprise simultaneously or alternatively a blocking bolt which can be arranged perpendicular in relation to the longitudinal direction in such a manner that the gripper tip and/or the gripper jaw can be fastened by the blocking bolt in a blocking opening of the gripper tip and/or gripper jaw in relation to the longitudinal direction. In practice, a locking element, in particular a spring-loaded locking element is often provided in such a manner that the blocking bolt can be locked by the locking element of the blocking opening. Even more preferably the blocking bolt and/or the locking element can, of course, be operated electrically, pneumatically, hydraulically or otherwise, in a manner known per se, thereby further increasing the degree of automation when the gripper tip is replaced.

Even if it is, of course, principally possible for a person to operate manually the mounting device according to the invention, in practice it is preferred to equip the mounting device according to the invention with its own driving units in such a manner that, for example, the distance carriage is designed movably in relation to the base carriage by a driving rod, in particular a driving screw or worm, wherein for displacing the base carriage and/or the distance carriage even more preferably a drive, in particular an electric motor is provided, and/or the mounting device according to the invention comprises a data processing system or is connected to such a system in such a manner that the replacement of the gripper finger can be done in a fully automatic and preferably freely programmable way.

BRIEF DESCRIPTION OF THE DRAWINGS

Referring now to the attached drawings which form a part of this original disclosure.

DETAILED DESCRIPTION OF THE EMBODIMENTS

Even if the mounting device according to the invention is not limited to the assembly of a gripper tip for a specific type of a gripper finger and the invention does not relate to a gripper finger as such or a gripper tip to be mounted as such, for a better understanding of the invention a new type of gripper finger developed by the applicant will be described shortly in the following, for which the mounting device according to the invention is particularly suitable.

Figure 1:
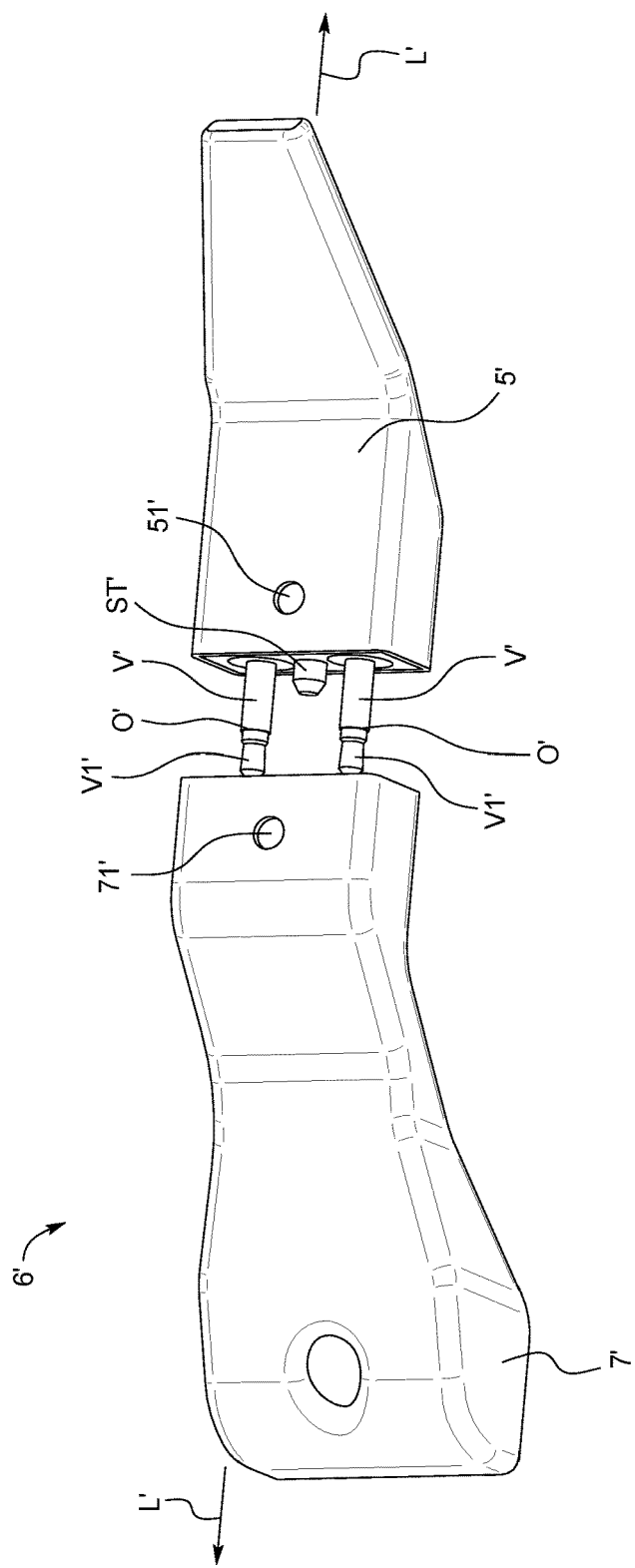
FIG. 1 is a special embodiment of a gripper finger in a schematic view.
Figure 2:
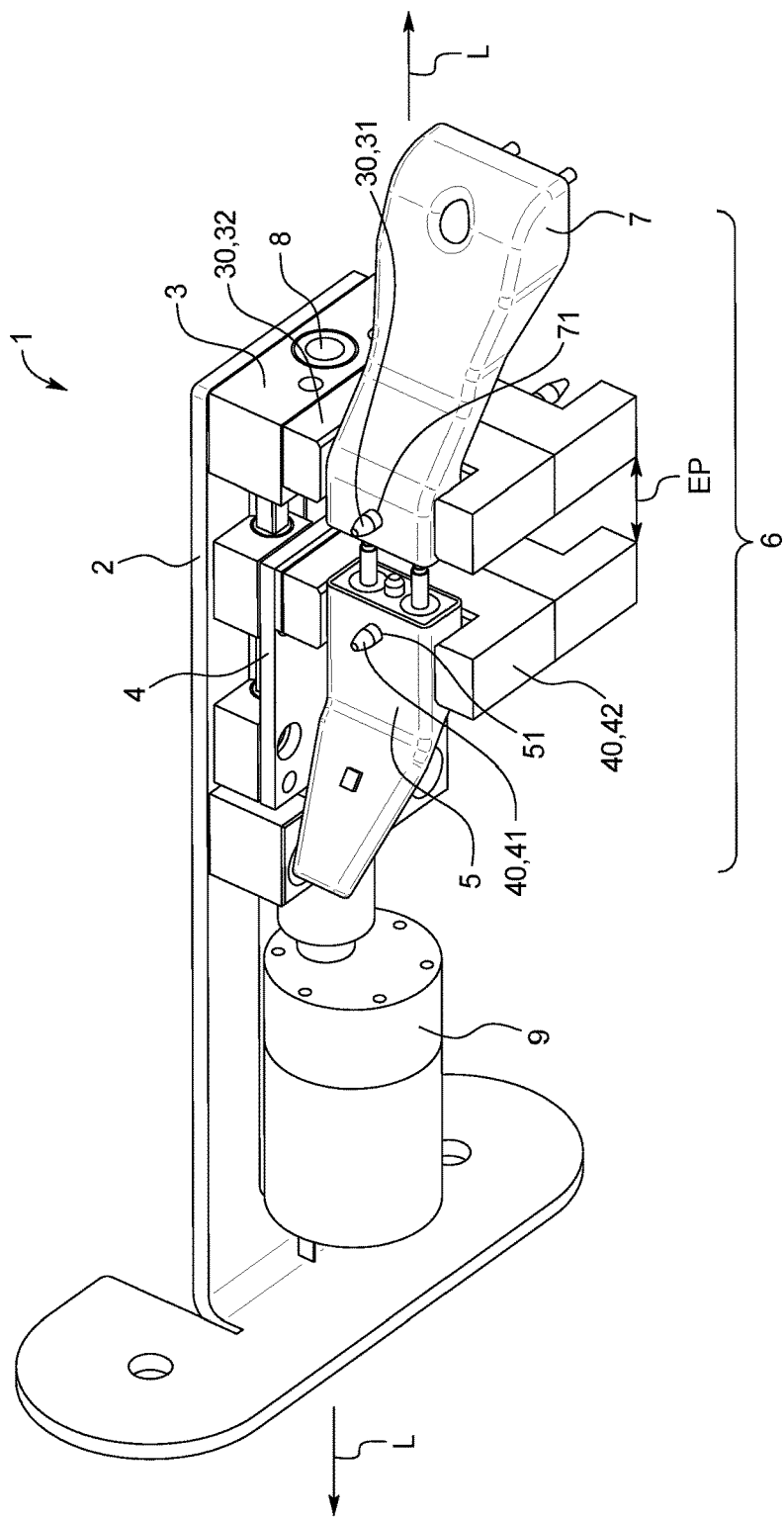
FIG. 2 is a mounting device according to the invention comprising an unlocked gripper finger.
Figure 3:
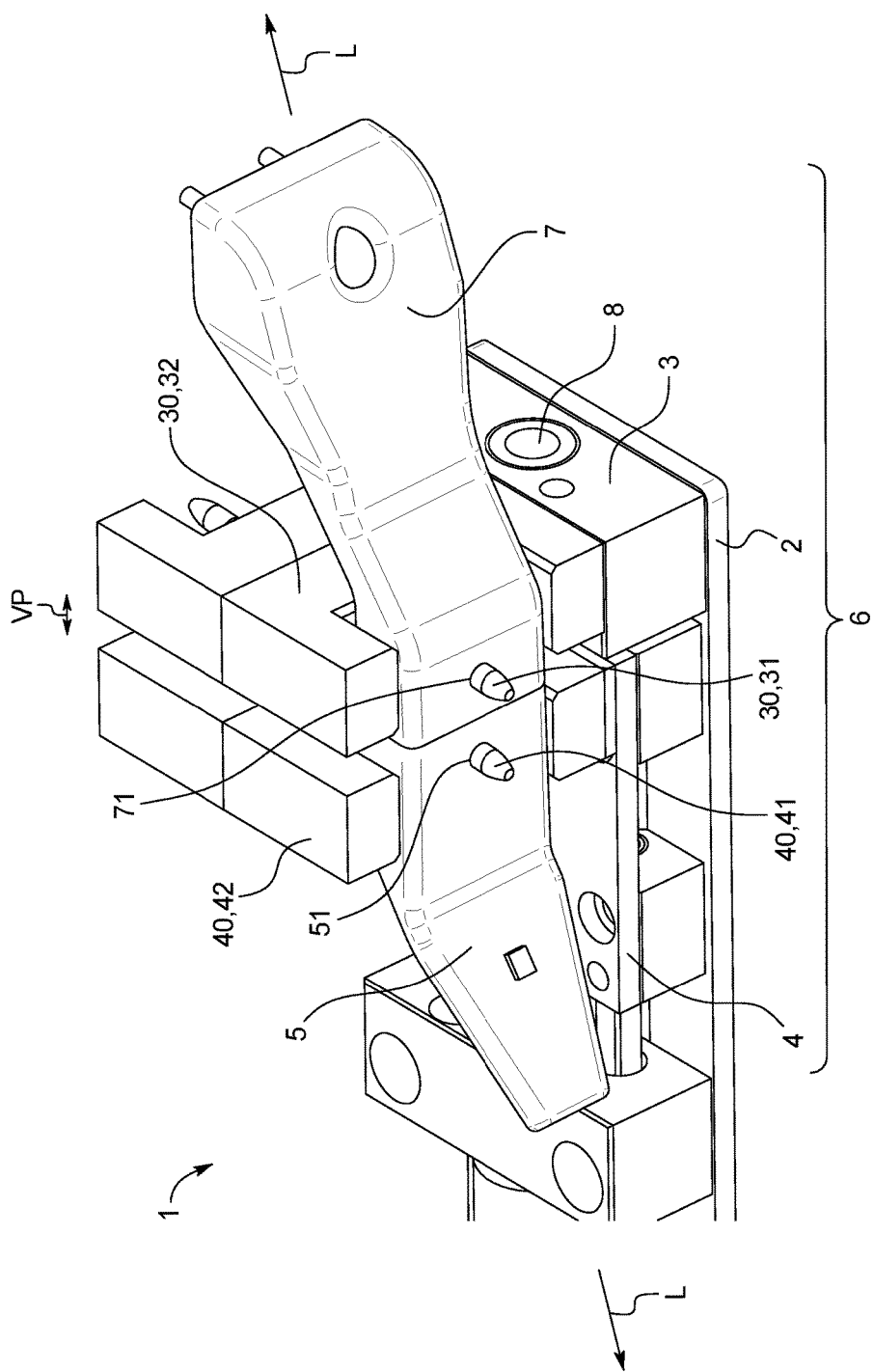
FIG. 3 is the mounting device of FIG. 2 comprising a gripper finger in the locked state.

In order to avoid any ambiguities as to the fact that the gripper finger of FIG. 1 is not part of the present invention, but only an example for a gripper finger for which the mounting device according to the invention for replacing the gripper tip is particularly suitable, the reference numerals in FIG. 1 have each an apostrophe, whereas the reference numerals concerning features of the mounting device according to the invention as shown in FIG. 2 and FIG. 3 have no apostrophe.

In this respect FIG. 1 shows by way of example and schematically a gripper finger 6' of a gripping tool for a robot system, which gripper finger 6' for grasping objects in a manner known per se comprises a gripper jaw 7' and a gripper tip 5' extending along a longitudinal direction L'. In the assembled state the gripper tip 5' is detachably connected to the gripper jaw 7' by two connecting elements V'. The connecting element V' can be locked with a connecting socket which extends in the longitudinal direction L', and which is not directly visible in FIG. 1 and hidden within the gripper jaw 7', in the form of a plug-in connection such that in the locked state it is impossible for the gripper tip 5' to tilt away in relation to the longitudinal direction L' and simultaneously the gripper tip 5' is locked against the gripper jaw 7' in relation to the longitudinal direction L' by a predefinable longitudinal locking force.

The connecting element V' comprises a first locking element V1' in the form of a front shaped as a handle and the connecting socket comprises correspondingly a second locking element complementing geometrically the first locking element V1' which is designed in such a manner that for generating the longitudinal locking force F the first locking element V1' can be locked with the second locking element. In the specific embodiment according to FIG. 1 an elastic force element O' in the form of a plastic O-ring is provided as additional locking element in such a manner that the desired locking force can be better or optimally adjusted.

In practice, different sensors, various electronical components or further components such as mechanical, hydraulic or pneumatic components which can fulfil a plurality of tasks in modern gripper fingers 6' in a manner known per se can be disposed in the gripper tip 5' as well as in the gripper jaw 7'.

In the present embodiment of FIG. 1 the connecting elements V' are simultaneously designed as electric lines for transferring electric energy between the gripper tip 5' and the gripper jaw 7' and thus they provide possibly existing sensors or other electronical components with electric energy. Additionally, there is a plug ST' provided for transmitting sensor signals between the gripper tip 5' and the gripper jaw 7'.

The fixing holes 51' and 71' which are disposed in the gripper tip 5' and the gripper jaw 7', respectively, are used for receiving the fixing bolts which are not shown here, as they can be provided in specific embodiments of the present invention to fasten the gripper tip 5' or the gripper jaw 7' to a mounting device according to the invention.

Thus, the gripper finger 6' of FIG. 1 is particularly characterized by the possibility of separating the gripper tip 5' from the gripper jaw 7' by one single linear movement along the longitudinal direction L' or to assemble it correspondingly.

The mounting device according to the invention described on the basis of FIG. 2 and FIG. 3 and designated in the following as a whole by the reference numeral 1, is particularly suitable for a type of a gripper finger according to FIG. 1, wherein it is explicitly indicated that the mounting device 1 according to the invention is not at all limited to the application of a gripper finger according to FIG. 1, but in practice can also be used advantageously and successfully for a plurality of completely different types of gripper fingers for replacing the gripper tip.

An embodiment of a mounting device 1 according to the invention which is even more preferred for the practice is shown on the basis of the schematic FIG. 2 in a schematic view in the operating state. As it can be recognized, the mounting device 1 has already received a gripper tip 5 and a gripper jaw 7 which are, however, still separated from each other in the processing step shown in FIG. 2 and have been assembled only in the subsequent processing step of the replacement procedure represented in FIG. 3 to a complete gripper finger 6.

The mounting device 1 according to the invention as shown in FIG. 2 or FIG. 3 for replacing a gripper tip 5 of a gripper finger 6 for a robot system comprises a mounting rail 2 having a base carriage 3 and a distance carriage 4. The base carriage 3 comprises a first fixing agent 30 for fastening a gripper jaw 7 of the gripper finger 6 and the distance carriage 4 comprises a second fixing agent 40 for fastening the gripper tip 5 in such a manner that the gripper jaw 7 can be fastened by the first fixing agent 30 to the base carriage 3 in relation to a longitudinal direction L and the gripper tip 5 can be fastened by the second fixing agent 40 to the distance carriage 4 in relation to the longitudinal direction L. According to the present invention the base carriage 3 and the distance carriage 4 are arranged movably against each other between a locked position VP and an unlocked position EP along the longitudinal direction L in such a manner that the gripper tip 5 is locked at the gripper jaw 7 in the locked position VP and the gripper tip 5 is unlocked from the gripper jaw 7 in the unlocked position EP.

In the present specific embodiment the first fixing agent 30 is a first fixing bolt 31 and the second fixing agent 40 is a second fixing bolt 41, wherein the first fixing bolt 31 is arranged perpendicular in relation to the longitudinal direction L at the base carriage 3 in such a manner that the gripper jaw 7 is fastened by the first fixing bolt 31 in a first fixing hole 71 of the gripper jaw 7 at the base carriage 3 in relation to the longitudinal direction L. By analogy, the second fixing bolt 41 is arranged perpendicular in relation to the longitudinal direction L at the distance carriage 4 in such a manner that the gripper tip 5 is fastened by the second fixing bolt 41 in a second fixing hole 51 of the gripper tip 5 at the distance carriage 4 in relation to the longitudinal direction L.

For mounting the gripper tip 5 or the gripper jaw 7 a first guiding element 32 is provided additionally as a further first fixing agent 30 and a second guiding element 42 is provided as a further second fixing agent 40 which are arranged each in the form of a U-shaped guiding element for mounting and guiding longitudinally the gripper tip 5 and the gripper jaw 7 at the base carriage 3 and the distance carriage 4, respectively.

The replacement procedure for replacing the gripper tip 5 is as follows in detail: First, the mounting device 1 is in the locked position VP so that the distance between the distance carriage 4 and the base carriage 3 is enough to insert the gripper finger 6 which is still in the locked state, i.e. still assembled, into both U-shaped guiding elements 32, 42 in such a manner that the first fixing hole 71 can receive the first fixing bolt 31 and the second fixing hole 51 can receive the second fixing bolt 41. Thanks to the first fixing bolt 31 and the second fixing bolt 41 the gripper finger 6 is securely fastened with the gripper tip 5 in relation to the distance carriage 4 and with the gripper jaw 7 in relation to the base carriage 3 in relation to the longitudinal direction L. Additionally, both guiding elements 32, 42 provide the gripper finger 6 with the necessary lateral guidance along the longitudinal direction L. When the gripper finger 5 is installed securely in the mounting device 1 according to the invention, the mounting device 1 is brought from the locked position VP to the unlocked position EP so that, as it is shown in FIG. 2, the gripper finger 6 is disassembled in such a manner that the gripper tip 5 is unlocked from the gripper jaw 7 and completely separated from it.

Then the gripper finger 5 is removed solely from the guiding element 42 by a device which is not shown in FIGS. 2 and 3 for reasons of clarity and after that another gripper finger 5 is inserted inversely into the guiding element 42. Then the mounting device 1 is brought again into the locked position VP, thereby reassembling and locking the new gripper tip 5 with the gripper jaw 8 which is still positioned in the guiding element 32. As a result, there is again an assembled and completely functional gripper finger 6 which only has to be taken as a whole from the mounting device 1 for further use.

For bringing the mounting device 1 from the locked position VP into the unlocked position EP and vice versa the distance carriage 4 can be moved via a driving rod 8 which in this case is a known driving screw by an electric drive 9 relative to the base carriage 3 along the longitudinal direction L. The man skilled in the art understands that in other embodiments the relative displacement of base carriage 3 and distance carriage 4 can also be done otherwise in a manner known per se, for example without electric drive 9 or without driving rod and that instead of the distance carriage also the base carriage or even both can be arranged movably at the mounting rail in the longitudinal direction.

It is self-evident that the configurations illustrated above and schematically represented in the figures can be used in any combination to form further configurations and to meet special requirements in practice.

The invention claimed is:

1. A mounting device, comprising:
a mounting rail comprising a base carriage and a distance carriage configured to replace a gripper tip of a gripper finger for a robot system, the base carriage comprises a first fixing agent configured to fasten a gripper jaw of the gripper finger and the distance carriage comprises a second fixing agent configured to fasten the gripper tip such that the gripper jaw is capable of being fastened by the first fixing agent to the base carriage in relation to a longitudinal direction and the gripper tip is capable of being fastened by the second fixing agent to the distance carriage in relation to the longitudinal direction, the first fixing agent including a first protrusion configured to pass through the gripper jaw, and the second fixing agent including a second protrusion configured to pass through the gripper tip, the base carriage and the distance carriage being movably arranged against each other between a locked position and an unlocked position along the longitudinal direction such that the gripper tip is locked at the gripper jaw in the locked position and the gripper tip is unlocked from the gripper jaw in the unlocked position, and at least one of the first fixing agent and the second fixing agent including a U-shaped guiding element, wherein the first and second protrusions are formed on a bottom surface of the U-shaped guiding element.

2. The mounting device according to claim 1, wherein the distance carriage is movable by a driving rod in relation to the base carriage.

3. The mounting device according to claim 1, further comprising a drive configured to displace at least one of the base carriage and the distance carriage.

4. The mounting device according to claim 1, further comprising a data processing system configured to control the mounting device.

5. The mounting device according to claim 1, wherein the first fixing agent includes the U-shaped guiding element, which is configured to longitudinally receive and guide the gripper jaw.

6. The mounting device according to claim 1, wherein the second fixing agent includes the U-shaped guiding element, which is configured to longitudinally receive and guide the gripper tip.

7. The mounting device according to claim 1, wherein the distance carriage is movable by a driving screw or worm, in relation to the base carriage.

8. The mounting device according to claim 1, further comprising an electric motor configured to displace at least one of the base carriage and the distance carriage.

9. The mounting device according to claim 1, further comprising a freely programmable data processing system configured to control the mounting device.

10. A mounting device, comprising:
a mounting rail comprising a base carriage and a distance carriage configured to replace a gripper tip of a gripper finger for a robot system, the base carriage comprises a first fixing agent configured to fasten a gripper jaw of the gripper finger and the distance carriage comprises a second fixing agent configured to fasten the gripper tip such that the gripper jaw is capable of being fastened by the first fixing agent to the base carriage in relation to a longitudinal direction and the gripper tip is capable of being fastened by the second fixing agent to the distance carriage in relation to the longitudinal direction, the base carriage and the distance carriage being movably arranged against each other between a locked position and an unlocked position along the longitudinal direction such that the gripper tip is locked at the gripper jaw in the locked position and the gripper tip is unlocked from the gripper jaw in the unlocked position, the first fixing agent including a first fixing bolt or the second fixing agent including a second fixing bolt, and at least one of the first fixing agent and the second fixing agent including a U-shaped guiding element.

11. The mounting device according to claim 10, wherein the first fixing bolt is perpendicularly arranged in relation to the longitudinal direction at the base carriage such that the gripper jaw is capable of being fastened by the first fixing bolt in a first fixing hole of the gripper jaw at the base carriage in relation to the longitudinal direction.

12. The mounting device according to claim 10, wherein the second fixing bolt is perpendicularly arranged in relation to the longitudinal direction at the distance carriage such that the gripper tip is capable of being fastened by the second fixing bolt in a second fixing hole of the gripper tip at the distance carriage in relation to the longitudinal direction.

13. The mounting device according to claim 10, wherein the first fixing agent includes the U-shaped guiding element.

14. The mounting device according to claim 10, wherein the second fixing agent includes the U-shaped guiding element.

15. A mounting device, comprising:
a mounting rail comprising a base carriage and a distance carriage configured to replace a gripper tip of a gripper finger for a robot system, the base carriage comprises a first fixing agent configured to fasten a gripper jaw of the gripper finger and the distance carriage comprises a second fixing agent configured to fasten the gripper tip such that the gripper jaw is capable of being fastened by the first fixing agent to the base carriage in relation to a longitudinal direction and the gripper tip is capable of being fastened by the second fixing agent to the distance carriage in relation to the longitudinal direction, the base carriage and the distance carriage being movably arranged against each other between a locked position and an unlocked position along the longitudinal direction such that the gripper tip is locked at the gripper jaw in the locked position and the gripper tip is unlocked from the gripper jaw in the unlocked position, the first fixing agent including a first guiding element, and the first guiding element comprises a blocking bolt arranged perpendicular in relation to the longitudinal direction such the gripper jaw is capable of being fastened by the blocking bolt in a blocking opening of the gripper jaw in relation to the longitudinal direction, and at least one of the first fixing agent and the second fixing agent including a U-shaped guiding element.

16. The mounting device according to claim 15, wherein the blocking opening includes a locking element disposed such that the blocking bolt is capable of being locked by the locking element of the blocking opening.

17. The mounting device according to claim 16, wherein the locking element is a spring-loaded locking element.

18. A mounting device, comprising:

a mounting rail comprising a base carriage and a distance carriage configured to replace a gripper tip of a gripper finger for a robot system, the base carriage comprises a first fixing agent configured to fasten a gripper jaw of the gripper finger and the distance carriage comprises a second fixing agent configured to fasten the gripper tip such that the gripper jaw is capable of being fastened by the first fixing agent to the base carriage in relation to a longitudinal direction and the gripper tip is capable of being fastened by the second fixing agent to the distance carriage in relation to the longitudinal direction, the base carriage and the distance carriage being movably arranged against each other between a locked position and an unlocked position along the longitudinal direction such that the gripper tip is locked at the gripper jaw in the locked position and the gripper tip is unlocked from the gripper jaw in the unlocked position, the second fixing agent including a second guiding element, and the second guiding element comprises a blocking bolt arranged perpendicular in relation to the longitudinal direction such that the gripper tip is capable of being fastened by the blocking bolt in a blocking opening of the gripper tip in relation to the longitudinal direction, and at least one of the first fixing agent and the second fixing agent including a U-shaped guiding element.

19. The mounting device according to claim 18, wherein the blocking opening includes a locking element disposed such that the blocking bolt is capable of being locked by the locking element of the blocking opening.

20. The mounting device according to claim 19, wherein the locking element is a spring-loaded locking element.

* * * * *